June 28, 1932.                R. WEST                1,864,703
EDUCATIONAL BLOCK
Filed April 7, 1931
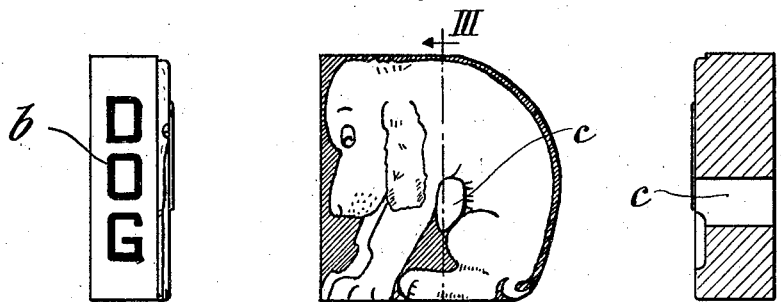
Fig.2.        Fig.1.        Fig.3.
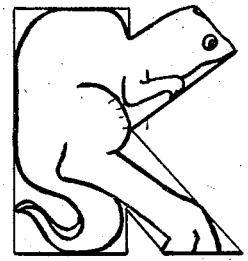
Fig.4.
Fig.5.        Fig.6.
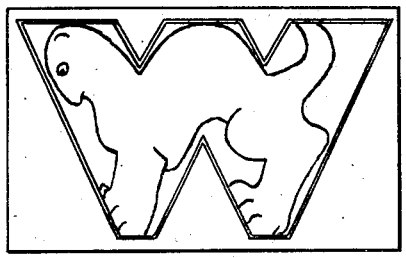    
Inventor
RUTH WEST
By her Attorney
Harry D. Nims Patented June 28, 1932

1,864,703

UNITED STATES PATENT OFFICE

RUTH WEST, OF NEW YORK, N. Y.

EDUCATIONAL BLOCK

Application filed April 7, 1931. Serial No. 528,288.

This invention relates to educational blocks.

The primary object of my invention is to provide an educational block that will create a strong impression of educational facts upon the minds of young children of primary grade age through association of ideas. Another object of the invention is to provide an educational block that will impart a knowledge of the letters of the alphabet to such children in an attractive way, and at the same time teach the names of various subjects.

To this end a block is formed in the shape of a letter of the alphabet and a subject is superimposed on the face of said block, positioned in such a manner that it conforms to the lateral contours of said letter. The letter of the alphabet and the subject superimposed thereon are combined in such manner that the block represents the first letter in the name of said subject. The name of the subject is also written out in full on a side or the rear of the letter where it can be seen only on turning the block.

It is possible to apply my invention to blocks other than those which are formed in the shape of a letter of the alphabet, as for example, a rectangular block may be employed having printed thereon a letter and subject combined in accordance with the provisions of my invention. The letter and subject may also be printed on paper which is attached to a rectangular block.

The requirement of my invention that the subject be positioned in such manner that it does not interfere with the contours of the letter of the alphabet represented, results in the necessity of placing the subjects in comical and sometimes fantastic positions. The fanciful nature of the block captures the imagination of children creating vivid impressions and leading them to a further study which will result in a disclosure of the identity of the subject represented.

A pronunciation of the name of the subject on the block will suggest that the first letter of the name of said subject is represented by the block. The child will only need a slight familiarity with the alphabet to appreciate that the name of the subject begins with the letter represented by the block.

In order that the invention may be clearly understood reference is made to the accompanying drawing which illustrates by way of example embodiments of my invention and in which:—

Figure 1 is a front elevation of a block according to one form of my invention.

Figure 2 shows a side view of the block shown in Figure 1.

Figure 3 is a sectional view on line III—III of Figure 1.

Figure 4 is a front elevation of a block according to another form of my invention.

Figure 5 is a front elevation of a block according to another form of my invention.

Figure 6 is a front elevation of a block to which a lower case letter is applied.

In Figure 1 the block is shaped in the form of a letter D and the representation of a dog is superimposed upon the block, the contour and position of the dog being prescribed by the shape of said letter.

Figure 2 shows a side of the block illustrated in Figure 1, on which the full name of the subject is placed at $b$. The name may if desired be placed on the back of the block. It is to be noted that a child viewing the block in its position shown in Figure 1, will be unable to see the name without turning the block to bring the part of the block on which it is provided into view. The block is ordinarily viewed in the position shown in Figure 1 and the printng of the full name of the subject, on the part of the block indicated, does not, therefore, interfere with the mental exercise of the child in determining the subject of the block and the particular letter of the alphabet represented thereby.

As shown in Figure 1, the subject superimposed on the letter may be carved out of the surface of the block and the central hole $c$ of the "D" extends through the full thickness of the block, though this is not necessary. The letter and the subject may be printed on paper which may be pasted on a block. In Figure 4 the letter "K" is so shown, enclosing the representation of a kangaroo, the paper and the lock being the shape of the letter. The block and the paper, however, need not be of the shape of the letter but may be of rectangular form as in Figure 5 of the drawing. The letter and subject may also if desired be printed on a rectangular block as shown in Figure 5 of the drawing in which a letter "W" is shown enclosing the representation of a weasel. Instead of printing any other means of transfer may be used.

The invention can be readily applied to the lower case letters as well as to the upper case letters as shown in Figure 6 in which a flamingo is represented within the outline of the lower case letter f. By having the subject conform to the shape of the letter the child is enabled to preceive the association at a glance and the peculiar contours of the various subjects achieved by this method intrigue the child and leave a distinct impression of the letter associated with the subject upon its mind.

A further step in the educational process is accomplished by my invention in providing for writing the full name of the subject on a side of the block. When a child has acquired a knowledge of the name of the subject and the letter of the alphabet depicted by the block, it can then turn the block so that one side thereof will be presented to view, bearing the name of the subject written out in full. Providing the name of the subject on the side of the block in this manner will facilitate teaching the child how to spell and just as the child associated the single letter with the subject so it will learn to associate the entire name with the subject and in a remarkably short time will be able to identify the entire word independently of the block.

It will be obvious that the animal superimposed on the letter "D" of the alphabet may be any other animal than a dog, such as a donkey, etc., the only requirement being that the first letter of the name of such subject be "D".

It will also be obvious that my invention is not limited to animals but may be applied to subjects in many other fields. For example: birds, flowers, trees and bugs respectively. Its benefits are equal in any of these applications.

Many other changes and modifications will suggest themselves and all such are included within the scope of the following claims.

The term "block form" as employed in the claims is intended to include not only a solid material, but also a material of block form which may be hollow, if desired, as will be apparent to those skilled in the art.

What I claim is:—

1. An educational device comprising a three dimensional block form having a design suggestive of a letter and also impressionistically representing some selected subject the said letter being the initial letter of an appellative for said subject.

2. An educational device comprising a three dimensional block form having a design depicted by the surface thereof suggestive of a letter and a design impressionistically representing some selected subject, conforming with said letter, said letter being the initial letter of an appellative for said subject.

3. An educational device comprising a three dimensional block form having a design suggestive of a letter and also impressionistically representing a member of the animal kingdom, the said letter being the initial letter of an appellative for said member of the animal kingdom.

4. An educational device comprising a three dimensional block form having a design depicted by the surface thereof suggestive of a letter and a design impressionistically representing some selected subject, conforming with said letter, said letter being the initial letter of an appellative for said subject, and carrying the full appellative on a different surface of the block.

5. An educational device comprising a three dimensional block form having a design superimposed thereon suggestive of a letter and also impressionistically representing some selected subject, the said letter being the initial letter of an appellative for said subject.

6. An educational device comprising a block in the shape of a letter of the alphabet, said block having a surface containing an impressionistic representation of a subject conformed within the outline of the letter, said letter being the initial letter of the common appellative designating said subject.

7. An educational solid comprising a block having substantially flat surfaces, one of said surfaces carrying a design consisting of the outline of a letter and an impressionistic representation of a subject conformed with the outline of the letter, said letter being the initial letter of the common appellative for said subject.

In witness whereof, I have hereunto subscribed my name this 6th day of April, 1931.

RUTH WEST.